(12) United States Patent
Kim (10) Patent No.: US 11,320,180 B2
(45) Date of Patent: May 3, 2022

(54) THERMOELECTRIC CRYOGENIC MATERIAL STORAGE CONTAINER

(71) Applicant: Hylium Industries, Inc., Seongnam-si (KR)

(72) Inventor: Seo Young Kim, Yongin-si (KR)

(73) Assignee: Hylium Industries, Inc., Seongnam-si (KR)

( * ) Notice: Subject to any disclaimer, the term of this patent is extended or adjusted under 35 U.S.C. 154(b) by 0 days.

(21) Appl. No.: 17/021,955

(22) Filed: Sep. 15, 2020

(65) Prior Publication Data

US 2021/0080156 A1    Mar. 18, 2021

(30) Foreign Application Priority Data

Sep. 16, 2019    (KR) .................. 10-2019-0113817

(51) Int. Cl.
*F25B 21/02*    (2006.01)

(52) U.S. Cl.
CPC .................... *F25B 21/02* (2013.01)

(58) Field of Classification Search
CPC .................. F25B 21/02; F17C 2223/0161
USPC ........................................... 62/3.6
See application file for complete search history.

(56) References Cited

U.S. PATENT DOCUMENTS

| 4,287,720 | A | * | 9/1981 | Barthel | F17C 3/08 62/45.1 |
| 4,593,529 | A | * | 6/1986 | Birochik | F17C 13/02 62/3.3 |
| 4,897,226 | A | * | 1/1990 | Hoyle | F17C 5/02 141/11 |
| 5,207,674 | A | * | 5/1993 | Hamilton | A61B 18/02 606/20 |
| 6,231,008 | B1 | * | 5/2001 | Schwarting | B64G 1/402 244/135 C |
| 6,921,858 | B2 | * | 7/2005 | Bingham | F17C 7/04 136/203 |
| 2002/0179425 | A1 | * | 12/2002 | Dableh | B01D 1/0017 203/1 |
| 2004/0089336 | A1 | * | 5/2004 | Hunt | H01L 35/30 136/205 |
| 2004/0154312 | A1 | * | 8/2004 | Abras | F25B 21/02 62/3.7 |

(Continued)

FOREIGN PATENT DOCUMENTS

KR    10-2017-0020092    2/2017

*Primary Examiner* — Gordon A Jones (74) *Attorney, Agent, or Firm* — H.C. Park & Associates, PLC (57) ABSTRACT

A thermoelectric cryogenic material storage container including: an inner container containing cryogenic liquid material; a supply pipe connected to the inner container to supply the cryogenic liquid material from the outside to the inner container; an outer container for accommodating the inner container to be spaced apart from each other; a discharge pipe provided to be connected to the inner container to discharge a vaporized material of the cryogenic liquid material vaporized in the inner container to the outside of the outer container; and at least one thermoelectric module provided to have one side in contact with the outer side of the supply pipe and the other side in contact with the outer side of the discharge pipe. When current is supplied to the thermoelectric module, the other side becomes a heating side, and the one side becomes a cooling side.

6 Claims, 5 Drawing Sheets

(56) References Cited

U.S. PATENT DOCUMENTS

2015/0342660 A1* 12/2015 Nash ................ A61B 17/8855
  606/21
2018/0363852 A1* 12/2018 Kim ..................... F25J 1/0025

* cited by examiner

THERMOELECTRIC CRYOGENIC MATERIAL STORAGE CONTAINER

BACKGROUND OF THE INVENTION

This application claims priority from and the benefit of Korean Patent Application No. 10-2019-0113817, filed on Sep. 16, 2029, which is hereby incorporated by reference for all purposes as if fully set forth herein.

BACKGROUND

Field

The present invention relates to a thermoelectric cryogenic material storage container, and more specifically, to a thermoelectric cryogenic material storage container capable of blocking inflow of heat and/or generation of thermoelectric power by using a thermoelectric module.

Discussion of the Background

Recently, due to the rapid development in industrialization and population increase, demands on energy are continuously increasing, and accordingly, supply and demand of alternative energy according to depletion of fossil fuel is urgently needed.

Hydrogen fuel is regarded as an alternative energy source attracting attention to solve these complex energy problems that the world is facing.

Hydrogen is the most abundant element on the planet, next to carbon and nitrogen, and, when used as a fuel, hydrogen is also a clean energy source that only generates a very small amount of nitrogen oxide during combustion without emitting any other pollutants at all. Hydrogen can be made using the abundant amount of water existing on the earth as a raw material, and since it is recycled back to water after use, hydrogen is an excellent alternative energy source without fear of depletion.

An important task required for using the hydrogen fuel is the method of storing hydrogen, including a method of compressing and storing hydrogen in a high-pressure gas cylinder, in the underground having geological properties, in a piping system, or the like, a method of storing hydrogen by way of solid adsorption using metal hydride, carbon nanotubes, glass microspheres, or the like, and a method of storing hydrogen in a container of a cryogenic temperature (−253° C.) state in a liquefied state.

Particularly, since hydrogen in a liquefied state is stored in a cryogenic form, when a very small amount of heat is transferred from an external heat source by way of conduction, convection, radiation or the like, vaporization of the hydrogen occurs, and the loss rate according to the vaporization may vary depending on the size and shape of the container and the type of an insulating material.

Korean Laid-opened Patent Publication No. 10-2017-0020092, "Liquid hydrogen storage container", is prior art directed to reducing inflow of heat from the outside of a liquid hydrogen storage container.

Although the application described above discloses effectively reducing or blocking radiant heat flowing from the outside into the liquid hydrogen storage container, there still is a problem with respect to conduction heat flowing in through a supply pipe for flowing liquid hydrogen into the storage container.

The above information disclosed in this Background section is only for understanding of the background of the inventive concepts, and, therefore, it may contain information that does not constitute prior art.

SUMMARY

Exemplary embodiments of the present invention provide a thermoelectric cryogenic material storage container capable of reducing the problems occurred by vaporization of a liquefied cryogenic material by introducing a thermoelectric module into a storage container that can store a liquefied cryogenic material, such as liquid hydrogen, to effectively reduce and/or block inflow of conduction heat from the outside.

Exemplary embodiments of the present invention also provide a thermoelectric cryogenic material storage container capable of enhancing energy efficiency by allowing a storage container of a cryogenic material to perform thermoelectric power generation by itself using a thermoelectric module so that the power may be used as an energy source of the storage container itself or a system (e.g., a drone, a vehicle or the like) employing the storage container.

Additional features of the inventive concepts will be set forth in the description which follows, and in part will be apparent from the description, or may be learned by practice of the inventive concepts.

An exemplary embodiment of the present invention provides a thermoelectric cryogenic material storage container including: an inner container containing cryogenic liquid material; a supply pipe connected to the inner container to supply the cryogenic liquid material from the outside to the inner container; an outer container for accommodating the inner container to be spaced apart from each other; a discharge pipe provided to be connected to the inner container to discharge a vaporized material of the cryogenic liquid material vaporized in the inner container to the outside of the outer container; and at least one thermoelectric module having one side in contact with the outer side of the supply pipe and the other side in contact with the outer side of the discharge pipe, wherein when current is supplied, the other side becomes a heating side, and the one side becomes a cooling side.

The discharge pipe may be provided to surround the outer side of the supply pipe in a spiral shape.

The thermoelectric cryogenic material storage container may further include a first medium provided between the outer surface of the supply pipe and the one side of the thermoelectric module, and the outer surface of the supply pipe and the one side of the thermoelectric module may be in contact with each other through the first medium.

The thermoelectric cryogenic material storage container may further included a second medium provided between the outer surface of the discharge pipe and the other side of the thermoelectric module, and the outer surface of the discharge pipe and the other side of the thermoelectric module may be in contact with each other through the second medium.

The first medium or the second medium may be implemented using a copper or aluminum material.

The thermoelectric module may perform thermoelectric power generation according to temperature difference between the outer side of the supply pipe and the outer side of the discharge pipe when no current is applied.

Another exemplary embodiment of the present invention provides a thermoelectric cryogenic material storage container including: an inner container containing cryogenic liquid material; a supply pipe connected to the inner container to supply the cryogenic liquid material from the outside to the inner container; an outer container accommodating the inner container to be spaced apart from each other; a discharge pipe connected to the inner container to discharge a vaporized material of the cryogenic liquid material vaporized in the inner container to the outside of the outer container; and at least one thermoelectric module. One side of the at least one thermoelectric module is in contact with the outer side of the inner container or the supply pipe, the other side of the at least one thermoelectric module is in contact with the outer side of the discharge pipe, and the at least one thermoelectric module may perform thermoelectric power generation according to temperature difference between the one side and the other side.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments or implementations of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
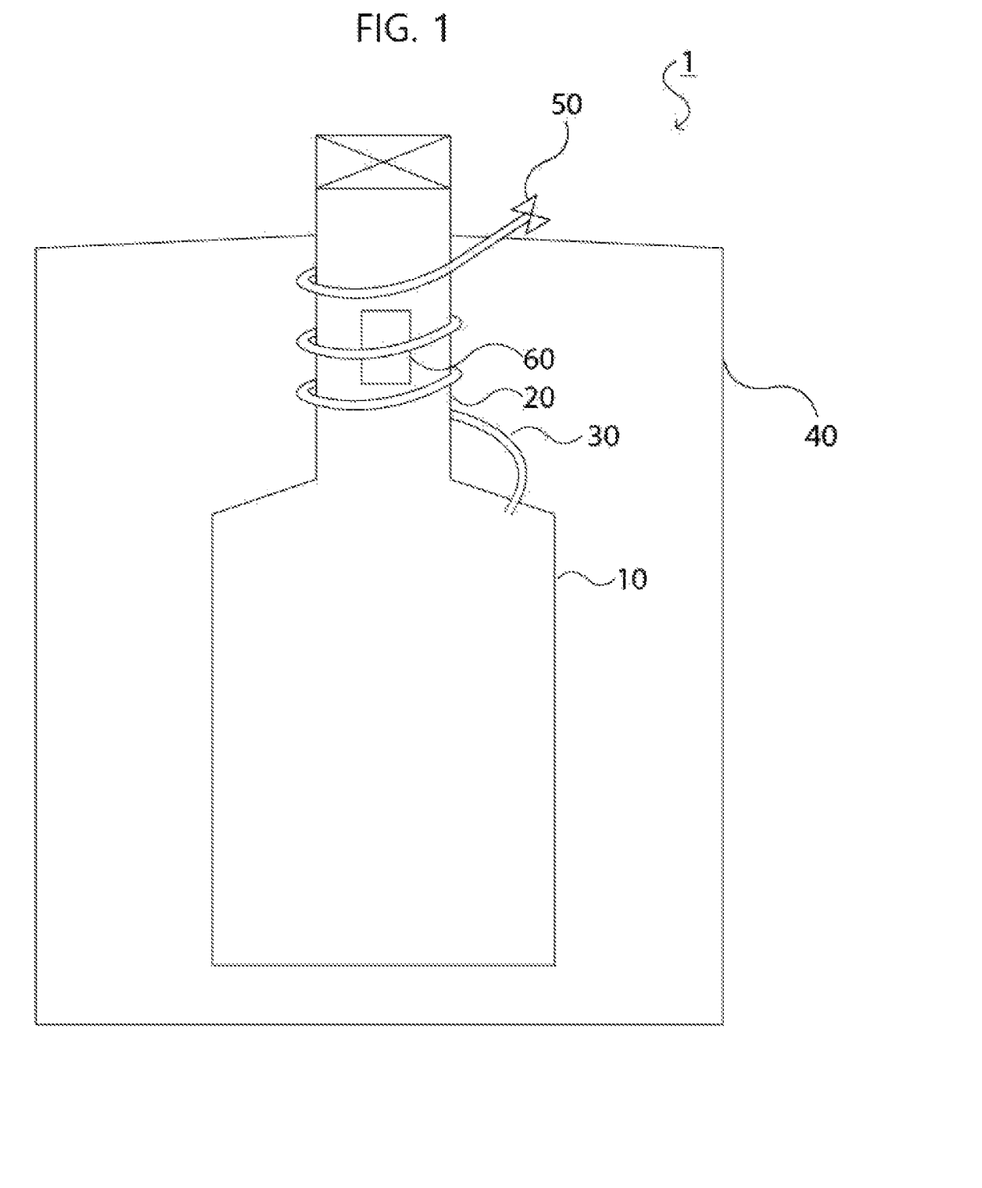
FIG. 1 is a cross-sectional view schematically showing the structure of a thermoelectric cryogenic material storage container according to an embodiment of the present invention.

FIG. 1 is a cross-sectional view schematically showing the structure of a thermoelectric cryogenic material storage container according to an embodiment of the present invention.

Referring to FIG. 1, a thermoelectric cryogenic material storage container 1 according to an embodiment of the present invention includes an inner container 10, a supply pipe 20, a discharge pipe 30, and an outer container 40.

The inner container 10 may contain a cryogenic material therein.

Although liquid hydrogen is exemplarily described in this specification as the cryogenic material, those skilled in the art may easily infer that is the inventive concepts are not limited thereto, and various materials that are in a liquefied state at a cryogenic temperature and are easily vaporized, such as liquid helium, liquid nitrogen, liquid oxygen, and liquid natural gas (LNG), may be stored in the thermoelectric cryogenic material storage container 1.

Although the inner container 10 may be implemented to block radiant heat from the outside by providing a gas flow path on the inner surface as shown, in this specification, separate description will be omitted to focus only on the technical features of the present invention.

The inner container 10 is implemented to be spaced apart from the outer container 40, and according to embodiments, a predetermined support or fixing member (not shown) capable of supporting the bottom of the inner container 10 may be further provided in the thermoelectric cryogenic material storage container 1.

The inner container 10 may receive and store a cryogenic material of a liquefied state through the supply pipe 20 communicated from one side (e.g., the top) to the outside of the outer container 40.

In addition, a coating-processed blocking layer may be formed on the outer surface of the inner container 10 to reflect radiant heat penetrating from the outside by increasing the emissivity, and copper, chrome, or the like may be used as a material for forming the blocking layer.

In addition, although not shown, the strength of the inner container 10 may be reinforced by densely winding a fiber material in the shape of a coil on the outer sidewall of the inner container 10 where the blocking layer is formed.

The outer container 40 is formed to be large enough to accommodate the inner container 10 in the inner space, and the inner surface of the outer container 40 and the outer surface of the inner container 10 may be spaced apart from each other. Since the inner container 10 and the outer container 40 are installed to be spaced apart from each other, heat applied to the outer container 40 may be prevented from being conducted and transferred to the inner container 10, and in addition, direct impacts to the inner container 10 can be prevented.

The thermoelectric cryogenic material storage container 1 may be implemented to fill the space between the inner container 10 and the outer container 40 with an insulating material, or a vacuum state may be maintained. As the vacuum state is maintained, vacuum insulation may be achieved, and heat applied to the outer container 40 and transferred to the inner container 10 by convection can be prevented.

As described above, the supply pipe 20 may function as a passage for flowing a cryogenic material of a liquefied state from the outside into the inner container 10. A predetermined device (e.g., a valve or the like) may be provided at the top of the supply pipe 20 to be opened when needed to fill a liquid cryogenic material, and may be installed to discharge the liquid cryogenic material only as much as required even when the liquid cryogenic material should be discharged to the outside as a fuel.

Since a considerable amount of heat conduction may be achieved through the supply pipe 20, there is a problem in that when heat flows into the inner container 10 due to the heat conduction, the cryogenic material of a liquefied state is vaporized more quickly, resulting in loss of fuel.

Therefore, according to the present invention, blockage or reduction of heat conduction through the supply pipe 20 can be provided as described below.

The discharge pipe 30 may be installed to discharge the vaporized cryogenic material to the outside of the external container 40.

In the discharge pipe 30, the liquefied cryogenic material may be easily vaporized even when a small amount of heat flows into the inner container 10 through radiation, conduction, or the like with the inner container 10, and when the liquefied cryogenic material is vaporized in such a manner, the internal pressure of the inner container 10 increases. Therefore, the vaporized cryogenic material (e.g., gaseous hydrogen) should be discharged to the outside for safety. For this purpose, the discharge pipe 30 may be implemented to communicate with the inner container 10 from one end to the outside of the outer container 40.

A predetermined valve (e.g., a safety relief valve 50) for selectively discharging gas according to the pressure of the gas may be provided at the discharging end of the discharge pipe 30. Although FIG. 1 exemplarily shows a case of providing one discharge pipe 30, it goes without saying that a plurality of discharge pipes 30 may be provided.

On the other hand, the discharge pipe 30 is a passage through which the vaporized cryogenic material is discharged, and although the vaporized cryogenic material has a temperature higher than that of a liquefied state of the cryogenic material, since the supply pipe 20 is in communication with the outside, the temperature of the discharge pipe 30 may be lowered to be less than the temperature of the supply pipe 20 due to the inflow of heat through conduction. Of course, the temperature may be higher toward the top of the supply pipe 20 (toward the outer side), and the temperature may be lower toward the bottom of the supply pipe 20 (toward the inner container 10).

Accordingly, the amount of heat conducted through the supply pipe 20 may be reduced by lowering the temperature of the supply pipe 20 using the discharge pipe 30 having a relatively lower temperature.

Particularly, according to the inventive concepts, there the temperature of the supply pipe 20 may be further reduced by using a thermoelectric module 60.

Figure 2:
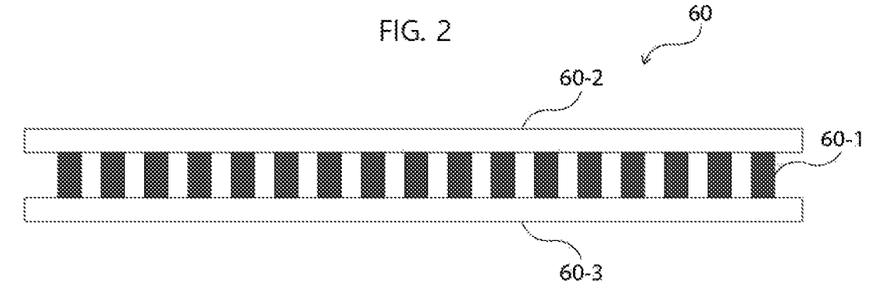
FIG. 2 is a view schematically showing the configuration of a thermoelectric module according to an embodiment of the present invention.

As shown in FIG. 2, the thermoelectric module 60 includes a plurality of thermoelectric semiconductor devices 60-1 (P-type thermoelectric semiconductor devices and N-type thermoelectric semiconductor devices) arranged between two substrates 60-2 and 60-3 spaced apart from each other. The plurality of thermoelectric semiconductor devices 60-1 may be soldered or brazed to be connected to a plurality of electrical contacts attached to both inner surfaces of the two substrates 60-2 and 60-3, and electrically, all or some part of the thermoelectric semiconductor devices 60-1 are arranged to be connected in series.

When a voltage is applied to the thermoelectric module 60, as a direct current passes between the P-type thermoelectric semiconductor devices and the N-type thermoelectric semiconductor devices connected in series, cooling or heating occurs according to the direction of current flow at the electrical contacts, to which the P-type thermoelectric semiconductor devices and the N-type thermoelectric semiconductor devices are attached. That is, any one substrate (e.g., 60-2) becomes a heating side and the other substrate (e.g., 60-3) becomes a cooling side, and when the direction of current is changed, the heating and cooling sides are reversed.

At this point, the cooling side may always have a temperature lower than that of the heating side, and when this characteristic of the thermoelectric module 60 is used, the supply pipe 20 may be cooled down to a temperature lower than the temperature of the supply pipe 20 that is simply lowered by using the temperature of the discharge pipe 30.

To this end, the thermoelectric module 60 may be installed so that the heating side (e.g., 60-2) may be in contact with the outer side of the discharge pipe 30 and the cooling side (e.g., 60-3) may be in contact with the outer side of the supply tube 20.

In this specification, that one side of the thermoelectric module 60 is in contact with the outer side of the supply pipe 20 or the discharge pipe 30 may mean to include a case of directly contacting the one side of the thermoelectric module 60 and the supply pipe 20 or the discharge pipe 30 and a case of contacting through a predetermined heat transfer medium having a high thermal conductivity.

In addition, although FIG. 1 shows a case in which the discharge pipe 30 is implemented to surround the outer side of the supply pipe 20 in a spiral shape, according to embodiments, the discharge pipe 30 may be installed in parallel with the supply pipe 20 in a straight line at a position close to the supply pipe 20. However, when the discharge pipe 30 is implemented to surround the supply pipe 20 in a spiral shape, the low temperature of the discharge pipe 30 may be more effective for lowering the temperature of the supply pipe 20.

Although a power supply and a wire for supplying current to the thermoelectric module 60 are not shown in FIG. 1 for convenience of explanation, those skilled in the art may easily infer that the power supply and wire may be installed inside or outside the thermoelectric cryogenic material storage container 1 as needed. In addition, when a wire for supplying current to the thermoelectric module 60 is installed to pass through the outer container 40, insulation may be required at the penetration point.

As shown in FIG. 1, the discharge pipe 30 may be arranged to directly contact the heating side of the thermoelectric module 60, and the cooling side, which is the other side of the thermoelectric module 60, may be arranged to directly contact the supply pipe 20.

However, in this case, the contact surface may be relatively narrow, and structurally, the degree of adhesion may be reduced.

Therefore, according to embodiments, the thermoelectric module 60 may indirectly contact with the supply pipe 20 and the discharge pipe 30 through a medium having high thermal conductivity. An example thereof is shown in FIG. 3, which is a view showing a method of combining a storage container and a thermoelectric module according to an embodiment of the present invention.

Figure 3:
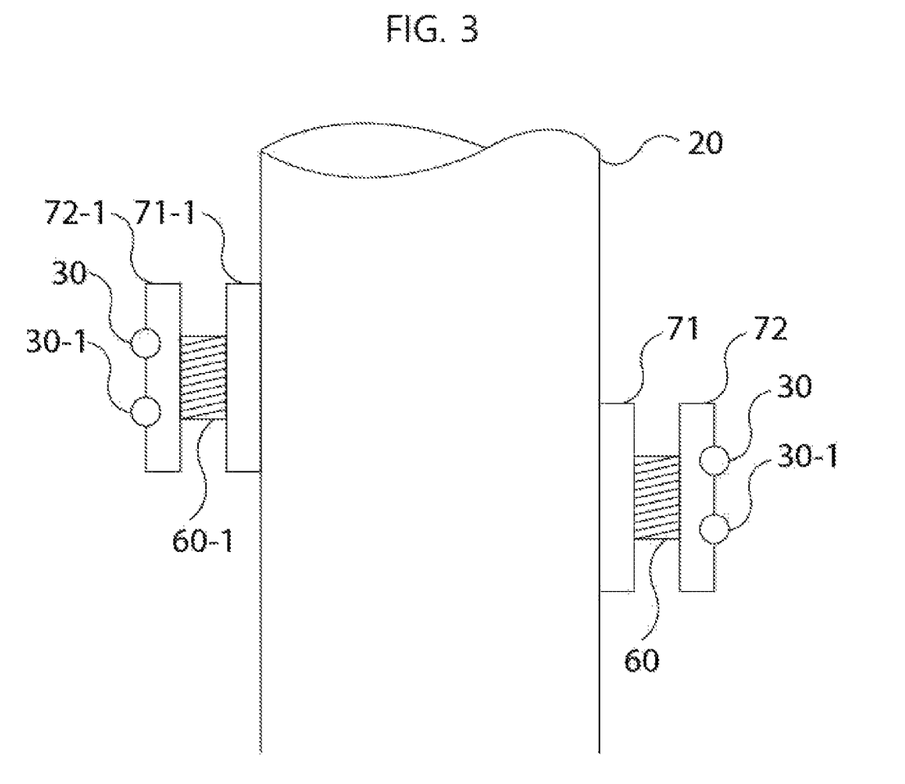
FIG. 3 is a view showing a method of combining a storage container and a thermoelectric module according to an embodiment of the present invention.

FIG. 3 shows a case in which a plurality of thermoelectric modules 60 and 60-1 is provided and respectively in contact with the supply pipe 20 and the discharge pipe 30 through heat transfer media 71, 71-1, 72, and 72-1 having high thermal conductivity.

Referring to FIG. 3, a first thermoelectric module 60 may be installed so that the cooling side is in contact with a predetermined first medium 71, and the first medium 71 may be installed to be in contact with the supply pipe 20.

In addition, the heating side of the first thermoelectric module 60 may be in contact with a second medium 72, and the second medium 72 may be in contact with the discharge pipes 30 and 30-1. Of course, although it is shown in FIG. 3 that the two discharge pipes 30 and 30-1 are implemented such that they are in contact with the second medium 72 and surrounding the supply pipe 20, the two discharge pipes 30 and 30-1 may be implemented such that one discharge pipe is in contact with the second media 72 and 72-1 in a spiral shape surrounding the supply pipe 20 as shown in FIG. 1.

The second thermoelectric module 60-1 may also be arranged so that the cooling side is in contact with the supply pipe 20 through the first medium 71-1 and the heating side is in contact with the discharge pipes 30 and 30-1 through the second medium 72-1, as shown in FIG. 3.

It is preferable that the material of the first medium 71 or the second medium 72 has high thermal conductivity to effectively transfer the temperature of the discharge pipe 30 to the heating side substrate of the thermoelectric modules 60 and 60-1 and effectively transfer the temperature of the cooling side substrate to the supply pipe 20.

For example, although the first medium 71 and/or the second medium 72 may be implemented using aluminum or copper, is the inventive concepts are not limited thereto.

In addition, although FIG. 3 shows a case in which the first medium 71 and the second medium 72 are disconnected and installed on one side and the other side of the supply pipe 20, if necessary, the first medium 71 and the second medium 72 may be provided to be connected to surround the supply pipe 20, and at least one thermoelectric module 60 may be installed between the first medium 71 and the second medium 72.

As a result, according to the inventive concepts, as compared with the case of lowering the temperature of the supply pipe 20 using only the discharge pipe 30 itself having a relatively low temperature, there is an effect of more effective cooling, as compared with the case of cooling the supply pipe 20 using only the discharge pipe 30, by using the characteristics of the thermoelectric module 60, in which the cooling side can be cooled down to a temperature lower than that of the heating side at all times.

The effect of reducing the amount of conducted heat in this case will be described with reference to FIGS. 4 and 5.

Figure 4:
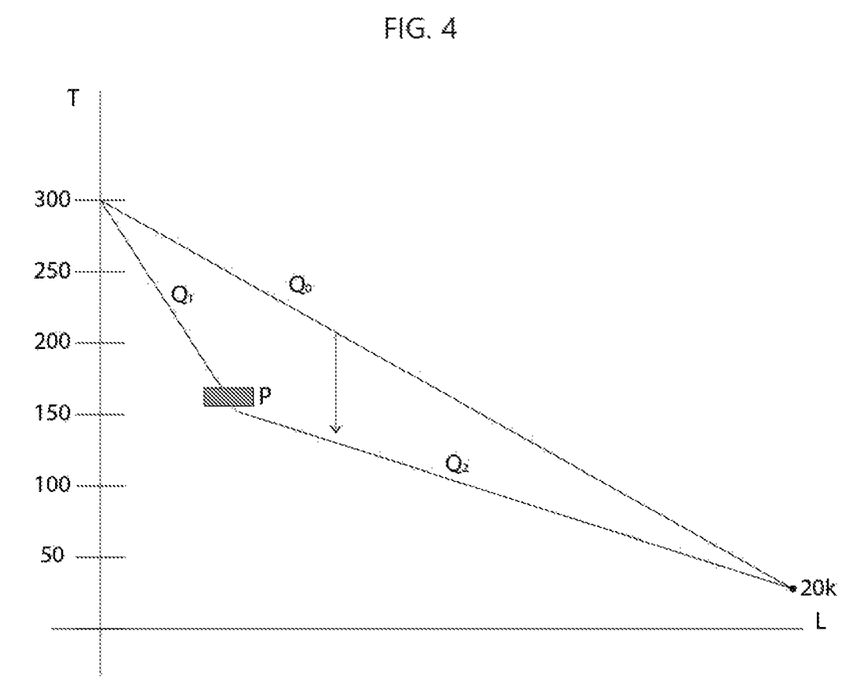
FIG. 4 and FIG. 5 are graphs showing the effect of reducing the amount of heat conduction of a thermoelectric cryogenic material storage container according to an embodiment of the present invention.
Figure 5:
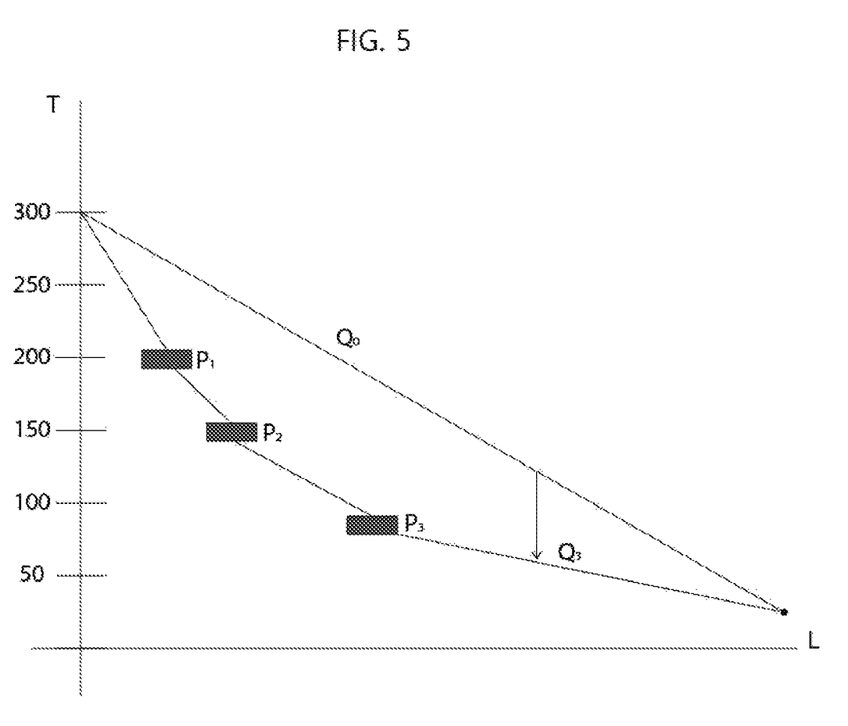

FIGS. 4 and 5 are graphs showing the effect of reducing the amount of heat conduction of a thermoelectric cryogenic material storage container according to an embodiment of the present invention.

First, the graph of FIG. 4 shows that heat conduction can occur through the supply pipe 20 on the assumption that the length of the supply pipe 20 is L, the external temperature is 300K, and the temperature at the bottom of the supply pipe 20 in the length direction (actually, the temperature may be slightly higher at the bottom of the supply pipe 20 as there exists a vaporized cryogenic material) is the temperature (e.g., 20K) of the liquefied cryogenic material (e.g., liquid hydrogen).

First, $Q_0$ is the heat conduction function according to the prior art, (i.e., when the supply pipe 20 is not cooled down by the discharge pipe 30 and the thermoelectric module 60 of the present invention) in which the amount of heat conduction is proportional to the thermal conductivity coefficient, the cross-sectional area of the medium, and the temperature difference between two points, and inversely proportional to the distance between the two points. At this point, since the thermal conductivity coefficient and the cross-sectional area of the medium are constants in the embodiment of the present invention, the amount of heat conduction is proportional to division of the temperature difference by the distance between the two points, i.e., the slope of the graph shown in FIG. 4, as a result.

As a result, the amount of heat conduction is proportional to each slope of the graphs of $Q_1$ and $Q_2$ shown in FIG. 4.

Therefore, the amount of heat conduction through the supply pipe 20 of the prior art is proportional to the slope of $Q_0$.

According to the inventive concepts and a predetermined position P of the supply pipe 20 is cooled down by at least one thermoelectric module, the temperature at the position P may be lowered to a temperature lower than the temperature of the discharge pipe 30 as described above, and in this case, as shown in FIG. 4, the temperature at the position P may be considerably lower than that of the prior art.

In this case, although the amount of heat conduction from the outside (the top of the supply pipe 20 to the position P) is proportional to the slope of $Q_1$, the conduction heat transferred to the bottom of the supply pipe 20, i.e., the inner container 10, is eventually proportional to the slope of $Q_2$. In addition, as is confirmed in FIG. 4, the slope of $Q_2$ becomes smaller than the slope of $Q_0$, and this may mean that the conduction heat transferred to the inner container 10 may be reduced.

FIG. 5 exemplarily shows a case of installing a plurality of thermoelectric modules at different positions in the length direction of the supply pipe, and $P_1$, $P_2$, and $P_3$ may indicate the positions of the thermoelectric modules sequentially installed from the top of the supply pipe 20. That is, $P_1$ may be the highest position among the plurality of positions in the supply pipe 20, and $P_3$ may be the lowest position in the supply pipe 20.

In this case, temperatures at positions $P_1$, $P_2$, and $P_3$ may be as shown in FIG. 5. That is, the temperature of the supply pipe 20 itself is the highest at $P_1$ and is at the lowest at $P_3$, and in addition, when the discharge pipe 30 passes through $P_3$, $P_2$, and $P_1$ in that order and is in contact with the heating side of the thermoelectric module at each position, the temperature of the discharge pipe is also low in the order of $P_3$, $P_2$, and $P_1$.

In addition, as described above, since the amount of conduction heat ultimately transferred to the inner container 10 is the amount of conduction heat transferred from the position $P_3$ to the bottom of the supply pipe 20, it is proportional to the slope of $Q_3$.

In this case, it can be seen that the amount of heat conduction is less than the amount of heat conduction (proportional to the slope of $Q_0$) of the prior art, as well as the amount of heat conduction (proportional to the slope of $Q_2$) of a case in which only one position is cooled down through the thermoelectric module, as shown in FIG. 4.

As a result, according to the inventive concepts, it can be seen that when at least one position of the supply pipe 20 is cooled down using the discharge pipe 30 and the thermoelectric module 60, there is an effect of significantly reducing inflow of heat by conduction.

The thermoelectric module 60 may generate power or perform cooling by using a Seeback effect or a Peltier effect, as is well-known.

That is, in addition to heating or cooling as described above, the thermoelectric module may generate power by using a phenomenon of generating electromotive force through the Seebeck effect when there is a difference in temperature between both ends of the thermoelectric module.

Therefore, according to the inventive concepts, as thermoelectric power generation is performed using the temperature difference between two predetermined positions in the thermoelectric cryogenic material storage container 1, the power may be used as an energy source of power required for cooling down the supply pipe 20, as described above, or may be used as an auxiliary energy source of a system (e.g., drones, automobiles, etc.) which uses the cryogenic material stored in the thermoelectric cryogenic material storage container 1 as an energy source.

Therefore, as described above, when at least one thermoelectric module 60 installed to cool down the supply pipe 20 does not need to cool down the supply pipe 20, the at least one thermoelectric module 60 may perform thermoelectric power generation. At this point, the temperature of the supply pipe 20 may be higher than the temperature of the discharge pipe 30, and the at least one thermoelectric module 60 may perform thermoelectric power generation by using this temperature difference.

Of course, the electricity generated through the thermoelectric power generation may be charged in a predetermined battery (not shown), and the battery (not shown) and wire are not shown in the drawings for convenience of explanation.

For example, in a state in which a cryogenic material is stored in the thermoelectric cryogenic material storage container 1 (for example, when a drone or a vehicle is in a stopped state), the thermoelectric module 60 may block or reduce vaporization of the cryogenic material by receiving power and cooling down the supply pipe 20.

In addition, since the cryogenic material is discharged to the outside through the supply pipe 20 when a predetermined system (e.g., a drone, a vehicle, or the like) uses the cryogenic material stored in the thermoelectric cryogenic material storage container 1 as an energy source (e.g., when a drone, a vehicle, or the like is in operation), at this point, one side of the thermoelectric module 60 in contact with the outer side of the supply pipe 20 becomes a low temperature part, and the other side of the thermoelectric module 60 in contact with the outer side of the discharge pipe 30 becomes a high temperature part and may perform thermoelectric power generation.

In addition to the thermoelectric module 60 installed to cool down the supply pipe 20, a thermoelectric module may be provided in the thermoelectric cryogenic material storage container 1 for thermoelectric power generation. An example thereof is shown in FIG. 6, which is a view showing the structure of a thermoelectric cryogenic material storage container according to another embodiment of the present invention.

Figure 6:
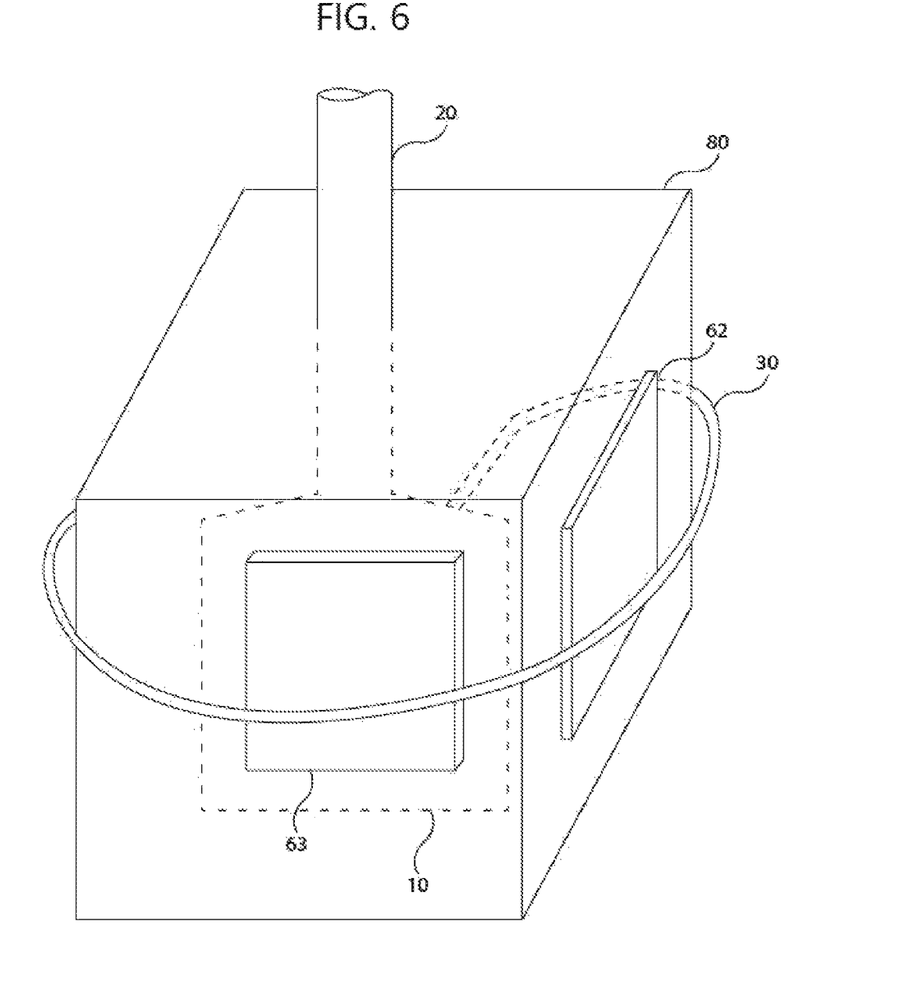
FIG. 6 is a view showing the structure of a thermoelectric cryogenic material storage container according to another embodiment of the present invention.

As shown in FIG. 6, according to the inventive concepts, at least one thermoelectric module 62 or 63 may be provided to perform thermoelectric power generation by using the temperature difference between the inner container 10, having the lowest temperature in the thermoelectric cryogenic material storage container 1, and the discharge pipe 30.

Of course, although one side and the other side of the at least one thermoelectric module 62 or 63 may directly contact the inner container 10 and the discharge pipe 30 respectively according to embodiments, a predetermined medium having high thermal conductivity (e.g., a housing 80 implemented using a material such as copper or aluminum) may be further provided in a form surrounding the inner container 10 for structural stability and expansion of the contact surface area.

The housing 80 is implemented to surround the inner container 10, and in this case, insulation coating or the like on the outer surface of the inner container 10 may be omitted. At this point, measures for blocking external radiant heat, such as thermal insulation coating or the like, may be implemented on the outer surface of the housing 80 (excluding the portion to which the thermoelectric module is attached).

In addition, the housing 80 may or may not be in contact with the inner container 10.

In addition, one side (low temperature part) of the at least one thermoelectric module 62 or 63 may be attached to the housing 80, and the other side (high temperature part) may directly contact the outer surface of the discharge pipe 30 or indirectly contact the outer surface of the discharge pipe 30 through a predetermined medium.

In this case, the at least one thermoelectric module 62 or 63 may perform thermoelectric power generation using the temperature difference between one side and the other side. In addition, the electricity generated through the power generation may be stored in a predetermined battery (not shown) and used when necessary, and the battery may be provided inside or outside the thermoelectric cryogenic material storage container 1.

In addition, the end portion of the discharge pipe 30 surrounding the housing 80 may be implemented to communicate toward the outer side of the outer container 40.

As a result, according to the inventive concepts, there is an effect of enhancing energy efficiency by reducing the heat flowing in from the outside by using a thermoelectric module, and also further enhancing the energy efficiency by performing power generation by itself.

According to the inventive concepts, there is an effect of reducing the problems occurred by vaporization of a liquefied cryogenic material by introducing a thermoelectric module into a storage container that can store a liquefied cryogenic material such as liquid hydrogen to effectively reduce and/or block inflow of conduction heat from the outside.

In addition, there is an effect of enhancing energy efficiency by allowing a storage container of a cryogenic material to perform thermoelectric power generation by itself using a thermoelectric module so that the power may be used as an energy source of the storage container itself or a system (e.g., a drone, a vehicle or the like) employing the storage container.

Although the present invention has been described with reference to the embodiments shown in the drawings, this is only illustrative, and those skilled in the art may understand that various modifications and equivalent other embodiments are possible. Accordingly, the true technical protection range of the present invention should be defined by the technical spirit of the attached claims.

What is claimed is:

1. A thermoelectric cryogenic material storage container comprising:
   an inner container configured to contain cryogenic liquid material;
   a supply pipe connected to the inner container and configured to supply the cryogenic liquid material from an outside to the inner container;
   an outer container for accommodating the inner container to be spaced apart from each other;
   a discharge pipe connected to the inner container and configured to discharge a vaporized material of the cryogenic liquid material vaporized in the inner container to an outside of the outer container; and
   at least one thermoelectric module having one side in contact with an outer side of the supply pipe and the other side in contact with an outer side of the discharge pipe,
   wherein, in response to a supply of current to the thermoelectric module, the other side becomes a heating side and the one side becomes a cooling side.

2. The container according to claim 1, wherein the discharge pipe surrounds the outer side of the supply pipe in a spiral shape.

3. The container according to claim 1, further comprising a first medium provided between an outer surface of the supply pipe and the one side of the thermoelectric module, wherein the outer surface of the supply pipe and the one side of the thermoelectric module are in contact with each other through the first medium.

4. The container according to claim 1, further comprising a second medium provided between an outer surface of the discharge pipe and the other side of the thermoelectric module, and the outer surface of the discharge pipe and the other side of the thermoelectric module are in contact with each other through the second medium.

5. The container according to claim 3 or 4, wherein the first medium or the second medium includes a copper or aluminum material.

6. The container according to claim 1, wherein the thermoelectric module performs thermoelectric power generation according to a temperature difference between the outer side of the supply pipe and the outer side of the discharge pipe when no current is applied to the thermoelectric module.

* * * * *